3,826,793
ANTICOAGULANT PEPTIDES RELATED TO
FIBRINO PEPTIDES
Gustav Erik Birger Blomback and Margareta Blomback, Stockholm, Per Ingemar Olsson, Vallingby, Lars-Gundro Svendsen and Bo Thuresson Af Ekenstam, Molndal, and Karl Goran Claeson, Vastra Frolunda, Sweden, assignors to Aktiebolaget Bofors, Bofors, Sweden
No Drawing. Continuation-in-part of abandoned application Ser. No. 769,370, Oct. 21, 1968. This application Sept. 10, 1970, Ser. No. 71,219
Int. Cl. C07c 103/52
U.S. Cl. 260—112.5
1 Claim

ABSTRACT OF THE DISCLOSURE

Polypeptides of natural amino acids having three to nine amino acids exhibit strong effects in reducing coagulation of the blood. The polypeptides exhibit principally antithrombopolastic activity and in addition show some antithrombin and fibrinolytic activities. One amino acid end of the polypeptide is phenylalanine and the other is preferably arginine.

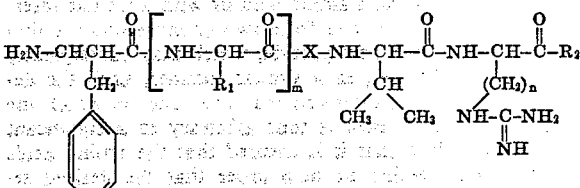

in which the optically active amino acids are of the L-configuration, and $R_1$ is isobutyl, sec-butyl or benzyl, $m$ is 0 or 1; X is

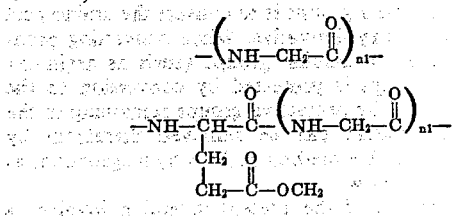

or

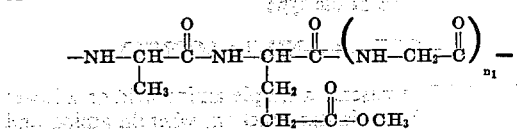

$n_1$ being an integer from 0 to 3, $R_2$ an alkoxy group having up to eight carbon atoms, and $n$ is 3.

---

This application is a continuation-in-part of our patent application Ser. No. 769,370, filed Oct. 21, 1968 now abandoned.

The present invention relates to polypeptides, and in particular to polypeptides which retard the coagulation of the blood.

The mechanism of blood coagulation is a complex one. In accordance with fairly generally accepted hypotheses the normal mechanism of blood coagulation can be separated into three phases: a first phase wherein thromboplastin is formed by the interaction between certain factors in the blood, a second phase during which the prothrombin of the blood is converted to thrombin during enzymatic action of a factor activated by the thromboplastin, and a third phase in which the thrombin, which is a proteolytic enzyme, converts fibrinogen to fibrin, whereupon a solid coagulum is formed. This conversion of the fibrinogen to fibrin is believed to proceed in two steps: (i) fibrinogen, through the influence of the thrombin, loses two short chain polypeptides, designated peptide A and peptide B, and (ii) aggregation of the molecules at the positions where the two peptides were lost, to form long fibrous complexes in the form of soft aggregates, which through intermolecular sulfur linkages are then converted into insoluble coagulums.

The initial formation of thromboplastin is activated at locations in blood vessels where damage has occurred. However, this thromboplastin, called intrinsic thromboplastin or plasma thromboplastin, can be replaced by an active product, designated extrinsic thromboplastin which is formed under the influence of a factor in the vascular tissues. The entire coagulation sequence is a series of enzymatic reactions, wherein various factors successively activate one another.

Several substances which retard the coagulation of blood are known. These substances are capable of exercising their effects at different steps in the complex process, from action of the blood vessels to strong fibrinolysis. Thus, an effect exerted on the coagulation mechanism may be in the form of a vascular activity, an antithromboplastin activity, an antithrombin activity or a fibrinolytic activity. In anticoagulation therapy in conjunction with surgery, it is necessary as early as possible to apply means which prevent the coagulation process from continuing when pathological changes have given reason to assume the likely occurrence of a thrombosis. The risk is also often present in the cases of young patients having undergone surgery.

Substances which influence the mechanism of coagulation and have been used in anticoagulation therapy, include heparin, coumarin derivatives, streptokinase and trypsin preparations. However, the use of these substances has presented certain difficulties; among them the problem of selecting an individually suitable dosage.

It is, accordingly, an object of the present inventon to provide effective anticoagulants which may be readily and conveniently administered.

The substances of the present invention are polypeptides which have antithromboplastic activity and thereby influence the formation of thrombin and antithrombin activity, whereby they retard the conversion of the fibrinogen to fibrin. Furtehrmore, certain of the polypeptides of the present invention have been found to possess other interesting activities. Thus, several of the polypeptides have shown to possess strong vascular activity, which is of great interest in the treatment of different disorders in the circulation of the blood.

The polypeptides of the present invention possess an amino acid sequence which conforms very closely to peptide A derived from man. The natural fibrinopeptides in question comprise 14–16 amino acids, but in the substances of the present invention it has been found that good activity can be obtained by using polypeptides containing only 3–9 amino acids, although longer chained polypeptides lie within the scope of the present invention. The polypeptides of the present invention contain the natural L-amino acids joined together by amide bonds. Although not expressly stated, it should be understood that the amino acids discussed in the following description and examples present an L-configuration. The maximum antithromboplastic activity is attained with integral helices in the polypeptide chains, that is to say when the number of amino acids is a multiple of 3. While any of the natural amino acids may be used, we have found phenylalanine and arginine to be essential in order to obtain a good antithromboplastic activity, especially when these amino acids occupy terminal positions.

The antithromboplastic activity is most desirable since it enables the mechanism of coagulaton to be influenced at an early stage. However, as has already been mentioned, an antithrombin activity and an fibrinolytic activity as well as in certain instances a vascular activity, are also shown by the polypeptides of this invention. It has not been possible to relate clearly the latter activity with the configuration of the natural peptide A. In its class the vascular activity can be considered a bradykinine-like activity.

The activities discussed in the aforegoing have been studied on large experimental animals in vivo and in blood from man, as will be described below.

The polypeptides according to the invention can be represented by the general formula

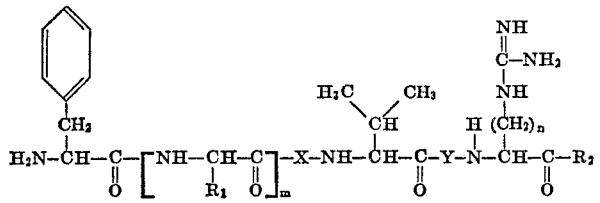

wherein
$R_1$ is hydrogen, butyl, iso-butyl, sec-butyl, or benzyl,
$m$ is 0 or 1,
X is (a) $-(NHCH_2CO-)_{n1}$, (b) 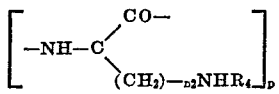

or (c) $-Ala-NH-CH-CO-(NHCH_2CO)_{n0}$
                 |
                 $R_3$ wherein $n_1$ is an integer from 0 to 3, $R_3$ is carboxy-, carbalkoxy- or carbamido lower alkyl, and Ala is alanine,
Y is

wherein $p$ is an integer from 0 to 1, $n_2$ is an integer from 2 to 4, and $R_4$ is hydrogen, guanyl, or carbamyl, $n$ is an integer from 2 to 4, and $R_2$ is (a) an alkoxy, alkanyloxy, or cycloalkoxy group having up to eight carbon atoms, (b) an amino group of the formula $$-N\begin{matrix}R_5\\R_6\end{matrix}$$

wherein $R_5$ and $R_6$ are hydrogen or alkyl, alkenyl or cycloalkyl groups having up to eight carbon atoms, (c)—Gly — Pro — Arg — $R_7$, wherein Gly is glycine, Pro is proline, Arg is arginine, and $R_7$ is (a) an alkoxyl, alkenyloxy, or cycloalkyloxy group having up to eight carbon atoms, or (b) an amino group of the formula —N $R_5$ $R_6$ wherein $R_5$ and $R_6$ are the same as above.

The alkyl, alkenyl, cycloalkyl, alkyloxy, alkenyloxy, and cycloalkoxy groups contain up to eight carbon atoms and include such groups as methyl, ethyl, propyl, isopropyl, butyl, sec-butyl, amyl, isoamyl, hexyl, heptyl, octyl, 2 - ethylhexyl, vinyl, alyl, propenyl, isopropenyl, cyclopropyl, cyclopentyl, cyclohexyl, 2 - methylcyclohexyl, methoxy, ethoxy, i-propoxy, butoxy, amyloxy, heptyloxy, octyloxy, 2-methylheptyloxy, allyloxy, cycloyloxy, cyclopentyloxy, 2 - ethylcyclopentyloxy, cyclohexyloxy, 4-ethylcyclohexyloxy, and the like.

The amino acid radical

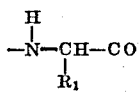

is either glycine, isoleucine, leucine, norleucine or phenylalanine. In certain peptides the amino acid radical can be eliminated while retaining the effect.

The meaning of the abbreviations hereinafter used is given in the following table.

TABLE 1

| Abbreviation | Name of amino acid in L-configuration |
|---|---|
| Val | Valine. |
| Arg | Argine. |
| Phe | Phenylalamine. |
| Gly | Glycine. |
| Leu | Leucine. |
| Ala | Alanine. |
| Glu | Glutamic acid. |
| Orn | Ornithine. |
| Pro | Proline. |

The compounds of the present invention are prepared by known methods for the synthesis of polypeptides. The general method involves constructing the specific polypeptides progressively, starting from the sample amino acids, by coupling the same in desired sequence while forming amide linkages. Thus, two amino acids can be reacted to form an intermediate product, which is then converted with a third amino acid or with a similar intermediate product obtained from two or more other amino acids to result in a new peptide, which may subsequently be converted further, in a similar manner, until the desired chain has been constructed. The order in which the amino acids are joined is thus arbitrary to a significant degree, providing that it is assured that the amino acids are coupled together in such order that the desired sequence of amino acids in the final product is obtained. During the reactions the free amino groups which are not to react are protected in a suitable way so that coupling takes place in a desired manner. A suitable method of protecting such amino groups is to convert the amino acid in the carbobenzyloxy derivative. When converting products which include guanidine groups (such as arginine) the guanidino groups is protected by conversion to the ω-nitro-derivative. The protective groups remaining in the obtained final product can be removed therefrom by means of some suitable method such as hydrogenation, as will be described below.

Thus, the process of the present invention involves a series of conversions of the type $$A-COZ-+-NH_2B \rightarrow ACONHB$$

wherein ACOZ represents a simple amino acid or a lower peptide formed by a similar reaction, wherein amino and carboxyl groups which shall not react are protected in a suitable manner, or a reactive derivative of such an amino acid or peptide, and $NH_2B$ represents an amino acid or peptide wherein carboxyl groups may be protected and amino groups which shall not react are protected in a suitable manner, the used amine acids and reaction sequences being so selected that a polypeptide according to the above formula is formed, whereafter undesired protective groups are removed.

Preparation of the claimed polypeptides is illustrated in the following examples. Examples I–XI together illustrate the complete synthesis of Phe-Leu-Ala-Glu(γ-OMe)-Gly-Gly-Gly-Val-Arg-O-Me. The remaining examples illustrate synthesis of other substances lying within the scope of the present invention, as well as various intermediate products of said substances; the products similarly being obtained in the form of derivatives containing protective groups. The separation of the protective groups is described by way of a summary after the examples and experimental details of some of the prepared derivatives are given in table form.

EXAMPLE I

Carbobenzoxy-valyl-ω-nitroarginine-methyl ester was produced according to methods A and B (A) 10.8 g. of a finely pulverized and dried ω-nitroargininemethyl ester hydrochloride (0.05 mole) was dissolved in 150 ml. of freshly distilled DMF (dimethylformide). After cooling, 5.6 ml. $Et_3N$ (0.04 mole) was added and the formed triethyl amine hydrochloride was removed by filtering. The filtered solution was cooled to —10° C. and under agitation 14.92 g. carbobenzoxyvaline-p-nitrophenylester (0.04 mole) was added. After 2 hours at 10° C. the temperature in the reaction mixture was allowed to rise to room temperature and react at this temperature for 24 hours.

DMF was evaporated in vacuum at 30–40° C. and the residue was dissolved in a mixture of ETOAc/n-BuOH (2:1). The solution was extracted five times with a 5% sodium bicarbonate solution, twice with water, three times with 1 N hydrochloric acid solution and finally three times with distilled water. The solution was dried over magnesium sulphate, evaporated to dryness and the residue dissolved in dry methanol. The substance was crystallized from the methanol solution by adding absolute ether. The yield: 14.1 g. having a melting point of 163–4° C. By adding petroleum ether to the mother liquor 1.1 g. of substance with a melting point of 155–156° C. was obtained.

Total yield 81.4%.

Analysis: $C_{20}H_{30}N_6O_7$ (mole weight 466.5). (Drying 10 hours at 70° C. over $P_2O_5$.) Calculated: C=51.49%; H=6.48%; N=18.02%. Obtained: C=52.02%; H=6.61%; N=17.99%.

(B) 5.4 g. ω-nitroarginine-methyl-ester hydrochloride (0.02 mole) was dissolved in 75 ml. DMF and after cooling 4.84 ml. tributylamine (0.02 mole) was added. When the temperature in the solution was —10° C., 7.0 g. carbobenzyloxy-valine (0.028 mole) which dissolves easily was added, and thereafter 5.77 g. DCCI (dicyclohexylcarbodiimide) (0.028 mole). The reaction mixture was stirred for two hours at —10° C., then for approximately 10 hours at 0° C. and finally 8 hours at room temperature. 1 ml. AcOH was added and after 30 minutes the formed DCU (dicyclohexylurea) was removed by filtering. (Weight 5.9 g.) The filtrate was evaporated and the residue dissolved in EtOAc—BuOH (2:1). Traces of undissolved DCU were removed by filtration. In other respects the process was performed as under (A). Yield: 7.35 g. with a melting point of 160–161° C., which is 78.9% of the theoretical. A substance with a melting point of approximately 131° C. and which was probably N-carbobenzoxy-valine - N,H' - dicyclohexylurea was obtained from the mother liquor.

EXAMPLE II

Preparation of carbobenzoxy-glycyl-glycyl-valyl-ω-nitroarginine-methylester 9.33 g. carbobenzyloxy-valyl-ω-nitroarginine - methyl ester (0.020 mole) was dissolved in 120 ml. dry AcOH and 10 g. dry, bromine-free hydrogen bromide was introduced into the solution at 20° C. for a period of 45 minutes. 80 ml. AcOH and the surplus of hydrogen bromide was distilled off in a vacuum at 20° C. and the residue was vigorously digested in one litre of ether. The ether phase was decanted and the residue was digested three times more with dry ether. The substance which had become granular was dried over phosphorus pentaoxide in vacuum desiccator. It was found to be very hygroscopic. The analysis on hydrogen bromide gave the result of approximately 1.5 equivalence hydrogen bromide per mole against a calculated one equivalent hydrogen bromide.

Yield: 9.2 g. valyl-ω-nitroarginine-methylester, 1.5 HBr.

The hydrobromide was dissolved in 80 ml. freshly distilled DMF and was cooled to 0° C. 4.30 ml. (0.031 mole) $Et_3N$ was added and subsequent to being stirred for 10 minutes the formed $Et_3N$ hydrobromide (approximately 3.55 g.) was removed by filtering. The filtrate was cooled to —10° C. and 7.75 g. carbobenzyloxy-glycyl-glycine-p-nitrophenylester having a melting point of 163–165° C. (0.020 mole) was added and the mixture was agitated for an hour at —10° C., and the temperature allowed to rise to room temperature. After 4 days at room temperature the solution was evaporated in a vacuum at 4° C. and the residue was treated with AcOEt, after which it crystallized.

Yield: 12.45 g. having a melting point of 152–154° C. The substance was dissolved in DMF and precipitated with a 5% sodium bicarbonate solution. The precipitate was washed with distilled water and ethanol. The substance was dissolved in DMF and precipitated out with a 5% citric acid solution, washed with distilled water and cooled ethanol and dried in a vacuum desiccator over $P_2O_5$.

Yield: 7.6 g. with a melting point of 176–181° C.

Analysis: $C_{24}H_{35}N_8O_9$ (mole weight 579.6). Drying 10 hours at 70° C. over $P_2O_5$ under 0.2 Torr.) Calculated: C=49.73%; H=6.09%; N=19.34%. Obtained: C=49.20%; H=6.34%; N=19.35%.

EXAMPLE III

Preparation of carbobenzoxy-alanyl-γ-methylglutamic acid 5.92 g. glutamic acid-γ-methyl ester hydrochloride (0.03 mole) was dissolved in a mixture of pyridine-water (1:1) and cooled to 5° C. Carbobenzoxy-alanine-p-nitrophenylester 10.32 g. (0.03 mole) was added to the mixture a little at a time and the pH value was held constant at 8.7 using 4 N NaOH. After 24 hours the solution was diluted with water and saturated with sodium bicarbonate. The saturated solution was extracted 7 times with EtOAc and acidified with a semi-concentrated hydrochloride acid to pH=2.9 at approximately 0° C., extracted with EtOAc and the EtOAc phase was washed with water saturated in common salt, dried over magnesium sulphate and evaporated to drynes. The residue was dissolved in absolute ether and upon addition of petroleum ether the substance crystallized out in the form of needles. Yield: 6.3 g. melting point 99.5–100.5° C., which is 57.3% of the theoretical.

Analysis: $C_{17}H_{22}O_7N_2$ (mole weight 366.4). Calculated: C=55.75%; H=6.05%; N=7.65%. Obtained: C=55.60%; H=5.98%; N=7.54%.

Equivalent weight: calculated, 366.4; obtained, 367.3, 368.1.

EXAMPLE IV

Preparation of carbobenz-glycine-carbo-tert.butyloxyhydrazide 20.9 g. carbobenz-glycine (0.1 mole) and 13.2 g. carbotert.butyloxyhydrazide (0.1 mole) was dissolved in 150 ml. acetonitrile. After cooling to 0° C. 20.6 g. DCCI (0.1 mole) dissolved in 50 ml. acetonitrile was added and the reaction mixture was allowed to stand at room temperature over night. The DCU formed was removed by filtering and the filter evaporated to dryness in a vacuum. The residue was dissolved in EtOAc and washed with a 5% citric acid, water, a 5% sodium bicarbonate and water. The EtOAc phase was dried over sodium sulphate and concentrated in a vacuum to a small volume, the substance crystallizing out. The substance was dissolved in ether and upon the addition of petroleum ether (90.1%) 29.1 g. carbobenzoxy-glycine-carbo-tert. butyloxyhydrazide crystallized out. Melting point 76.83° C. Recrystallization from EtOAc-petroleum ether gave 23.1 g. (71.5%) having a melting point 80–84° C. Further recrystallization increased the melting point to 82–84° C.

Analysis: $C_{15}H_{21}N_3O_5$ (mole weight 323.36). Calculated: C=55.72%; H=6.54%; N=13.00%. Obtained; C=55.39%; H=6.66%; N=13.35%.

EXAMPLE V

Preparation of glycine-carbo-tert.butyloxyhydrazide 9.7 g. carbobenzoxy-glycine-carbo-tert.butyl oxyhydrazide (0.03 mole) was dissolved in 100 ml. methanol and 0.5 g. 10% Pd/C was added and hydrogen gas introduced. After 12 hours 660 ml. hydrogen gas had been used and the hydrogenation interrupted. The catalyst was removed by filtering and the methanol driven off under vacuum. The residue was digested with absolute ether, a substance having a melting point of 141–143° C. crystallizing out.

Yield: 5.3 g. (93% of the theoretical).

The melting point of the substance after a recrystallization from methanol-ether increased to 145–146° C.

Analysis: $C_7H_{15}N_3O_3$ (mole weight 109.22). Calculated: C=44.43%; H=7.99%; N=22.21%; E-weight=189.2. Obtained: C=43.94%; H=7.97%; N=22.35; E-weight =191.0.

EXAMPLE VI

Preparation of carbobenzoxy-phenylalanyl-leucine ethyl ester 9.8 g. leucine ethyl ester hydrochloride (0.05 mole) was dissolved in 30 ml. DMF, and 5.06 g. $Et_5N$ (0.05 mole) was added. The formed $Et_3N\cdot HCl$ was removed by filtering and washed with slightly cooled DMF.

15.0 g. carbobenzoxy-phenylalanine (0.05 mole) was dissolved in 30 ml. DMF-acetonitrile (1:1) and cooled to −10° C. after which 10.4 g. DCCI (0.05 mole) and the filtrate from the above, containing leucine ethyl ester, was added. The temperature of the reaction mixture was allowed to rise overnight to room temperature and 1 ml. 50% AcOH was added. After 30 minutes, the formed DCU was removed by filtering and the filtrate was evaporated to dryness in a vacuum at 40° C. The residue was dissolved in EtOAc and the small amount of undissolved DCU was removed by filtering. The EtOAc solution was washed with 1 N hydrochloric acid, water, a 5% sodium bicarbonate solution and water. The ethylacetate phase was dried over magnesium sulphate and concentrated in a vacuum to a small volume. After adding petroleum ether, carbobenzyloxy - phenylalanyl - leucine ethyl ester crystallized out in the form of needles, having a melting point of 116–117° C.

Yield: 19.45 g. (88.3% of the theoretical). Subsequent to recrystallization from ethyl acetate-petroleum ether the melting point was raised to 117–117.5° C.

Analysis: $C_{25}H_{32}N_2O_5$ (mole weight 440.55). Calculated: C=68.16%; H=7.32%; N=6.36%. Obtained: C=67.74%; H=7.18%; N=6.58%.

EXAMPLE VII

Preparation of carbobenzoxy-phenylalanyl-leucine hydrazide 8.4 g. carbobenzoxy-phenylalanyl-leucine ethyl ester (0.02 mole) was dissolved in 150 ml. methanol and 4.0 g. hydrazine hydrate (0.08 mole) was added. The mixture was agitated over night and the carbobenzoxy-phenylalanyl-leucine hydrazide formed was removed by filtering and washed with a small quantity of methanol. Recrystallized from methanol water and gave a yield of 6.6 g. having a melting point of 192.5–193.5° C. which is 81.5% of the theoretical.

Analysis: $C_{23}H_{30}H_4O_4$ (mole weight 426.53). Calculated: C=64.77%; H=7.09%; N=13.14%. Obtained: C=64.85%; H=7.12%; N=13.16%.

EXAMPLE VIII

Preparation of carbobenzoxy-γ-methyl glutamyl-glycine-carbo-tert.butyloxy-hydrazide 7.4 g. carbobenzoxy-γ-methyl glutamic acid (0.025 mole) was dissolved in 50 ml. methylene chloride and cooled to −10° C., after which 5.4 g. DCCI (0.0265 mole), dissolved in 25 ml. cooled methylene chloride, was added under agitation and finally 4.73 g. glycine carbo-tert.butyloxy hydrazide (0.025 mole), dissolved in 25 ml. cooled ethyl acetate was added. The temperature of the mixture was allowed to rise over night to room temperature and 30 minutes before DCU was removed by filtering two drops of 50% AcOH was added. The filtrate was evaporated to dryness in a vacuum and the residue dissolved in EtOAc, which was washed with 5% sodium bicarbonate, water, a 5% citric acid solution, water, and dried over magnesium sulphate. The EtOAc solution was concentrated to a small volume and subsequent to the addition of petroleum ether 8.5 g. of the substance was crystallized out, the substance had a melting point of 104–105.5° C. Recrystallization of EtOAc-petroleum ether raised the melting point to 107–108° C.

EXAMPLE IX

Preparation of carbobenzoxy - alanyl-γ-methyl glutamyl-glycine-carbo-tert.butyloxy hydrazide according to the methods A and B (A) 1.83 g. carbobenzoxy-alanyl-γ-methyl glutamic acid (5 mole) was dissolved in 10 ml. methylene chloride and after cooling to −10° C. 1.08 g. DCCI (5.2 mole), dissolved in 5 ml. cooled methylene chloride, was added, and finally 0.95 g. glycine-carbo-tert.butyloxyhydrazide (5 mole) dissolved in 10 ml. cooled ethyl acetate was added. The mixture was agitated and allowed to stand overnight at room temperature, after which two drops of a 50% AcOH was added. After 30 minutes the DCU (1.1 g.) formed was removed by filtering and washed with a small amount of EtOAc. The filtrate was evaporated to dryness in a vacuum and the residue was dissolved in EtOAc, which was washed with a 5% sodium bicarbonate solution, water, a 5% citric solution and water. The EtOAc phase was dried over magnesium sulphate and concentrated to a small volume, whereby 2.3 g. of substance with a melting point of 140–150° C. crystallized out. After two recrystallization sequences from EtOAc the melting point rose to 154–156° C. and gave a yield of 1.9 g., which is 70.4% of the theoretical.

Analysis: $C_{24}H_{35}N_5O_9$ (mole weight 537.58). Calculated: C=53.62%; H=6.56%; N=13.03%. Obtained: C=53.48%; H=6.52%; N=12.79%.

(B) 40 g. carbobenzoxy-γ-methyl glutamyl - glycine-carbo-tert.-butyloxy hydrazide (0.06 mole) was dissolved in 60 ml. methanol and 0.5 g. 10 pd/C (moistened with water) was added. The carbobenzoxy-protective group was hydrogenated away with hydrogen gas at room temperature and atmospheric pressure for a period of 2 to 3 hours. The amount of hydrogen gas used was 200 ml. against the calculated 195 ml. The catalyst was removed by filtering and the filtrate evaporated to dryness in a vacuum. The residue was dissolved in absolute ether, evaporated to dryness whereby an oil was obtained. The oil was dried in a vacuum desiccator over phosphorus pentoaxide whereby the oil converted to a solid hydroscopic substance which weighted 2.76 g.; which is 96.5% of the theoretical yield. The product, 2.76 g. was dissolved in 40 ml. DMF and cooled down to −10° C. and 3.0 g. carbobenzoxy-alanine-p-nitrophenyl ester (8.6 mole) was added. The solution was allowed to rise slowly to room temperature and after 24 hours was evaporated to dryness in a vacuum. The residue was treated as described under Example A.

Yield: 3.35 g. with a melting point of 151–155° C. is 75.5% of the theoretical. After recrystallizing three times from EtOAc the melting point was raised to 160.5–161° C. (rearranged at 153° C.).

EXAMPLE X

Preparation of carbobenzyloxy - phenylalanyl - leucyl-alanyl-γ-methyl glutamyl - glycine-carbo-tert.butyloxy hydrazide 1.08 g. IX (2 mole) was dissolved in 50 ml. methanol, 0.2 g. of a 10% PD/C was added and hydrogen gas introduced. After three hours the hydrogenation was complete and 55 ml. (theoretical 45 ml.) had been used. The catalyst was removed and the solution evaporated to dryness in a vacuum. The residue was dissolved in 15 ml. DMF.

0.86 g. VII (2 mole) was dissolved in 3 ml. 6 N hydrochloric acid+2 ml. of a 50% AcOH and superposed with 40 ml. EtOAc. The mixture was cooled down to −10° C. and 2.0 ml. 1 molar sodium nitrite was added in drops under agitation. After 15 minutes at −10° C. the EtOAc phase was separated from the water phase and washed with cooled, saturated sodium bicarbonate solution and ice water. The EtOAc solution was dried over magnesium sulphate for 1 hour at −10° C. The EtOAc solution which contained carbobenzoxy-phenylalanyl-leucine azide was slowly added dropwise to the DMF solution, which contained the free amino peptide, under agitation and at −10° C. After 24 hours at 0° C. and 2 days at room temperature the formed precipitate was removed by filtering. Yield: 0.35 g. with a melting point of 207–208° C. The mother liquor was evaporated to dryness and the residue was dissolved in EtOAc, washed with a 5% sodium bicarbonate, water, a 5% citric acid solution, water, dried over magnesium sulphate and concentrated in a vacuum. The residue was dissolved in EtOAc and upon adding petroleum ether 0.70 g. substance was recrystallized out, having a melting point of 180–200° C. Together this gave 0.80 g. in yield, which is 50.1% of the theoretical. A small amount was recrystallized once more, from EtOAc.

Analysis: $C_{39}H_{55}N_7O_{11}$ (mole weight 797.9). Calculated: C=58.71%; H=6.95%; N=12.29%. Obtained: C=58.48%; H=6.77%; N=12.35%.

EXAMPLE XI

Preparation of carbobenzoxy-phenylalanyl-leucyl-alanyl-γ-methyl glutamyl-glycyl-glycyl-glycyl-valyl-ω-nitroarginine methyl ester 334 mg. X (0.42 mole) was dissolved in 1.8 ml. trifluoroacetic acid and after 45 minutes at 22° C. the trifluoroacetic acid solution was introduced dropwise under agitation into 100 ml. of absolute ether.

After being left for two hours in a refrigerator the precipitate was removed by filtration and washed repeatedly in absolute ether, whereafter the precipitate was dissolved in 4 ml. DMF and 1 ml. 4 N hydrochloric acid. The solution was cooled to −10° C. and 0.42 ml. 1 M sodium nitrite solution was introduced dropwise under agitation for a period of 5 minutes, whereupon the solution and formed precipitate were introduced dropwise into 30 ml. of an ice-cold 2% sodium bicarbonate solution; the precipitation of the formed acid azide becoming complete. The azide was washed on the filtrate with ice water, ice-cold 5% citric acid solution and finally was freed from all citric acid with ice water. It was dried rapidly over phosphorus pentaoxide in a vacuum at 5° C. and used immediately for coupling. The yield of dry carbobenzoxy-phenylalanyl-leucyl-alanyl-γ-methyl glutamyl-glycine azide was 291 mg., which is 98% of the theoretical. 243 mg. II (0.42 mole) was dissolved in 2 ml. absolute AcOH and 1 ml. 4 N hydrobromide in AcOH was added, and the mixture was allowed to stand for 45 minutes, protected against atmospheric moisture at room temperature; after which the mixture was introduced dropwise into 100 ml. of absolute ether under strong agitation. The precipitate was washed and digested with absolute ether until it became granular (hygroscopic). The tetra-peptidemethyl ester hydrobromide was dissolved in 4 ml. DMF, and 0.09 ml. Et₃N (0.64 mole) was added to the solution which was cooled to −10° C., and the above azide dissolved in 10 ml. DMF and precooled to −10° C. was added dropwise under agitation at −10° C. After 24 hours at 0° C. the solution was allowed to stand for two whole days at room temperature, whereupon it was concentrated to 5 ml. at 20° C. under vacuum. 5 ml. DMF were redissolved and added under agitation to 40 ml. of a 5% citric acid solution. The precipitate was washed free from citric acid with water and dried in a vacuum over phosphorus pentaoxide. Yield: 265 mg. with a melting point of 203–213° C., which is 66.7% of the theoretical. Two precipitations from DMF water raised the melting point to 211–215° C.

Analysis: $C_{50}H_{73}N_{13}O_{16}$ (mole weight 1112.2). Calculated: C=53.99%; H=6.62%; N=16.37%. Obtained: C=53.51%; H=6.56%; N=16.72%.

EXAMPLE XII

Preparation of carbobenzoxy-phenylalanyl-nitro-arginine methyl ester 10.8 of ω-nitroarginine methyl ester hydrochloride (40 mole) was dissolved in DMF and 4.05 g. of Et₃N (40 mole) was added under cooling. The formed Et₃N.HCl was removed by filtering and a cooled solution (−10° C.) of 12.0 g. of carbobenzoxy-phenyl-alanine (40 mole) in acetonitrile was added to the filtrate, the said acetonitrile being provided at −10° C. with 9.1 g. of DCCI (40 mole). The solution was agitated for two hours at −10° C. and the temperature was permitted to rise to room temperature overnight.

The DCU formed was removed by filtering and the filtrate evaporated to dryness and the residue dissolved in EtOAc and washed in the normal manner. Crystals having a melting point of 87–89° C., were obtained from the EtOAc solution upon addition of absolute ether. Subsequent to crystallization from 60% ethanol, crystals of another modification having a melting point of 153.5–155° C. were obtained.

Yield: 17.90 g. (87.1% of the theoretical).

Analysis: $C_{24}H_{30}N_6O_7$ (mole weight 514.55). Calculated: C=56.02%; H=5.88%; N=16.33%. Obtained: C=55.94%; H=6.09%; N=16.42%.

EXAMPLE XIII

Preparation of carbobenzoxy-phenylalanyl-valyl-ω-nitro-arginine-methyl ester 9.33 g. I (20 mole) was treated as described under II. The yield of hygroscopic valyl-ω-nitroarginine methyl ester. 1.5 HBr was 9.15 g., which is quantative, subsequent to drying in a vacuum over KOH and P₂O₅.

The hydrobromide dipeptide ester was dissolved in 50 ml. DMF and cooled to −5° C., after which 4.2 ml. of Et₃N (30 mole) was added. The formed Et₃.HBr was removed by filtering and 8.4 g. of carbobenzoxy-phenyl-alanine-p-nitrophenyl ester (20 mole) was added to the filtrate. After 24 hours at room temperature the solution was cooled to −10° C., an additional 1.4 ml. of triethylamine was added and the mixture was allowed to stand for a further 24 hours. Subsequent to adding 1 ml. of AcOH the solution was evaporated to dryness in a vacuum, the residue dissolved in a mixture of EtOAc-BuOH (3:1) and washed as usual in water and a 5% citric acid and water. The solution was dried over MgSO₄, evaporated to a low volume, which upon the addition of absolute ether gave 10.1 g. of substance having a melting point of 108–111° C. which is 82.3% of the theoretical. Recrystallization from EtOAc methanol subsequent to adding absolute ether raised the melting point to 112–114° C.

Analysis: $C_{29}H_{39}N_7O_8$ (mole weight) 613.69). Calculated: C=56.76; H=6.41%; N=15.98%. Obtained: C=56.32% H=6.48%; N=16.12%.

EXAMPLE XIV

Preparation of carbobenzoxy-phenylalanyl-glycyl-valyl-ω-nitroarginine-methyl ester 2.3 g. I (5 mole) was treated as under II, and the obtained hydrobromide-dipeptidemethyl ester was dissolved in 15 ml. of DMF, cooled to −5° C. and added with 1.5 ml. of Et₃N. (7.5 mole). Et₃N.HBr was removed by filtering and the filtrate was used below.

1.85 g. of carbobenzoxy-phenylalanyl-glycinehydrazide (5 mole) was dissolved in 7 ml. DMF and added with 1.5 ml. 6 N hydrochloric acid was cooled to −10° C. and 5.1 ml. of 1 M sodium nitrate solution (5.1 mole) was added dropwise under agitation. After 10 minutes at −10° C. 50 ml. of a 5% sodium bicarbonate solution was added and at 0° C. the azide began to precipitate; the precipitation was complete when adding 30 ml. ice-cold water, was agitated for 10 minutes filtered and washed carefully with ice water. The precipitate was slurried in ice water under agitation and filtered and washed with ice water at a temperature of 0° C. The process was repeated three times and the substance dried in a vacuum at 5° C. over $P_2O_5$, whereupon it was used immediately.

Yield: 1.77 g. (93% of the theoretical).

The azide dissolved in 8 ml. DMF, precooled to −10° C. was added dropwise under agitation to the DMF solution of amino dipeptide cooled to −10° C. After 10 minutes at −10° C. the mixture was allowed to stand for 48 hours at room temperature, was concentrated in a vacuum to 7 ml. and treated as described under XI. Yield: 2.44 g. (78.2% of the theoretical). Recrystallization from 60% ethanol gave 1.95 g. substance with a melting point of 147–149° C.

Analysis: $C_{31}H_{42}N_8O_9$ (mole weight 670.74). Calculated: C=55.51%; H=6.31%; N=16.71%. Obtained: C=55.38%; H=6.58%; N=16.90%.

EXAMPLE XV

Preparation of carbobenzoxy-phenylalanyl-glycyl-glycyl-valyl-ω-nitroarginine ethyl ester 1.77 g. I (3.8 mole) was treated as under II and the obtained hydrobromide-dipeptide methyl ester was dissolved in 10 ml. DMF, cooled to −5° C. and 0.79 ml. of Et₃N (5.7 mole) was added, EtN.HBr was removed by filtration and the filtrate was used below.

1.62 g. of carbobenzoxy-phenylalanyl-glycyl-glycine hydrazide (3.8 mole) was dissolved in 10 ml. DMF and 1 ml. 6 N hydrochloric acid was added, cooled to −10° C. 3.85 ml. of 1 N sodium nitrate solution (3.85 mole) was added dropwise under agitation and treated in other respects as described under XIV. Yield: 155 g. (95% of the theoretical).

Carbobenzoxy-tripeptide azide dissolved in 9 ml. DMF, precooled to −10° C. was added dropwise under agitation to the DMF solution of amino dipeptide ester, cooled to −10° C. The treatment in other respects was the same as that described under XI.

Yield: 1.93 g. with a melting point of 185–190° C. was 73.1% of the theoretical. Recrystallization from 90% ethanol raised the melting point to 188–191° C.

Analysis: $C_{33}H_{45}N_9O_{10}$ (mole weight 727.8). Calculated: C=54.45%; H=6.23%; N=17.32%. Obtained: C=55.01%; H=6.18%; N=17.52%.

EXAMPLE XVI

Preparation of carbobenzoxy-phenylalanyl-glycyl-glycyl-glycyl-valyl-ω-nitroarginine methyl ester 1.74 g. II (3 mole) was dissolved in 7 ml. of dry AcOH and under moisture-free conditions 7 ml. 4 N HBr in AcOH was added. After 45 minutes at room temperature the development of carbon dioxide had ceased and the reaction was complete. The surplus of hydrobromide over 7 ml. AcOH was distilled in a vacuum and the residue was introduced under strong agitation into 15 ml. of absolute dry ether. The ether was decanted off and the residue, which adopted a granular consistency, was digested a further three times with dry ether. The residue was dried over P₂O₅ and KOH in a vacuum and the yield of tetrapeptide ester hydrobromide was 1.652, which is 95% of the theoretical calculated on 1.5 equivalence HBr per mole peptide. The hydrobromide was dissolved in 20 ml. DMF and cooled to −10° C., whereafter 0.60 ml. Et₃N (4.28 mole) was added and the formed Et₃N.HBr was removed by filtering. 1.44 g. carbobenzoxy-phenylalanyl-glycine-p-nitrophenyl ester (3 mole) was added to the filtrate under agitation, at a temperature of −10° C., and after 24 hours at room temperature the solution was cooled to −10° C. and a further 0.20 ml. of Et₃N was added, whereafter it was allowed to stand for a further 24 hours. The working-up process was conducted as described under II.

Yield: 1.59 g. at a melting point of 164–167° C. was 71.2% of the theoretical. Recrystallization from 60% methanol raised the melting point to 169–172° C.

Analysis: $C_{35}H_{48}N_{10}O_{11}$ (mole weight 784.85). Calculated: C=53.56%; H=6.17%; N=17.85%. Obtained: C=54.01%; H=6.08%; N=17.99%.

EXAMPLE XVII

Preparation of carbobenzoxy-phenylalanyl-phenylalanyl-valyl-ω-nitroarginine methyl ester 2.33 g. I (5 mole) was treated as described under II and XIV and the obtained solution of valyl-ω-nitroarginine methyl ester was used below.

2.3 g. carbobenzoxy-phenylalanyl-phenylalanine hydrazide (5 mole) was dissolved in 7 ml. DMF and 3 ml. 4 N hydrochloride acid was added, cooled to −10° C., and 5.1 ml. NaNO₂ solution was added dropwise under agitation. Working-up was conducted as described under XIV. The yield, 2.26 g. carbobenzoxy-phenylalanylphenylalanine azide, which is 96% of the theoretical, was dissolved in 8 ml. of DMF, was cooled to −10° C. and under agitation was added dropwise to a precooled solution of the amino dipeptide ester. The process was then continued as described under examples XI and XIV.

Yield: 2.14 g. with a melting point of 218–220° C. was 58.7% of the theoretical.

Analysis: $C_{38}H_{48}N_8O_9$ (mole weight 760.87). Calculated: C=59.99%; H=6.36%; N=14.73%. Obtained: C=59.49%; H=6.33%; N=14.81%.

EXAMPLE XVIII

Preparation of carbobenzoxy-phenylalanyl-leucyl-valyl-ω-nitroarginine-methyl ester 2.33 g. I (5 mole) was treated as described under examples II and XIV. The obtained DMF solution of valyl-ω-nitroarginine-methyl was used below.

2.13 g. of VII (5 mole) was dissolved in a mixture of 5 ml. 6 N hydrochloric acid and 5 ml. of a 50% AcOH, was superposed with 80 ml. of EtOAc; the process in other respects was conducted as described in Example X. The EtOAc solution with the carbobenzoxy-di-peptide azide was cooled to −10° C. and was added dropwise under agitation to the above prepared DMF solution, the said DMF solution being precooled to −10° C. The process in other respects was identical with that described under Example X and the obtained EtOAc solution was evaporated to dryness, the residue dissolved in 7 ml. DMF and purified as described in Example XI.

Yield: 2.65 g. with a melting point of 171–181° C. was 72.9% of the theoretical. The product was further recrystallized twice from 60% ethanol, the melting point being raised to 179–182° C.

Analysis: $C_{32}H_{50}N_8O_9$ (mole weight 726.85). Calculated: C=57.84%; H=6.94%; N=15.42%. Obtained: C=58.05%; H=7.01%; N=15.35%.

EXAMPLE XIX

Preparation of carbobenzoxy-valyl-ω-nitroarginine amide 45.8 g. carbobenzoxy - ω - nitroarginine amide (0.13 mole) with a melting point of 217–218° C. was dissolved in 300 ml. waterfree AcOH and under moisture-free conditions 300 ml. of 2 N HBr in dry AcOH was added under agitation. After 45 minutes at room temperature the development of carbon dioxide was complete, whereupon the reaction mixture was evaporated in a vacuum at 20°

C. under moisture-free conditions until the residue had a volume of 250 ml. The residue was introduced dropwise into 2.5 l. dry ether under strong agitation; a plastic mass being precipitated. The other phase was decanted off and the residue digested a further three times with dry ether; the resulting substance being granular and solid. The substance was dried in a vacuum over $P_2O_5$ and KOH, was dissolved in 350 ml. of DMF and 18.5 ml. of $Et_3N$ (0.134 mole) was added.

After cooling to −10° C. the formed $Et_3N.HBr$ was removed by filtration and 48.4 g. of carbobenzoxy-valine-p-nitrophenyl ester (0.13) mole was added under agitation to the filtrate. The reaction mixture was allowed to stand for 24 hours at room temperature, was concentrated to 100 ml. and poured under agitation into a 1 litre 5% sodium bicarbonate solution. The substance precipitated was removed by filtering, washed with water and redissolved in 75 ml. of DMF and poured down into 1 litre 1 N hydrochloric acid, was filtered and washed with water. Yield: 47.1 g. with a melting point of 6.15–63° C. was 80.2% of the theoretical. Recrystallization from 60% ethanol raised the melting point of the product to 66–67° C., but after recrystallization from ethanol with the addition of water the melting point was 218–219° C.

Analysis: $C_{19}H_{29}N_7O_6$ (mole weight 451.5, substance with melting point 218–219° C.). Calculated: C=50.55%; H=6.47%; N=21.72%. Obtained: C=50.57%; H=6.62%; N=21.89%.

EXAMPLE XX

Preparation of carbobenzoxy-phenyalanyl-ω-nitroarginine amide 1.76 g. carbobenzoxy-ω-nitroarginine amide (5 mole) was treated as described under Example XIX, and the obtained DMF solution of ω-nitroarginine amide was cooled to −10° C., whereafter 2.1 g. of carbobenzoxy-phenylalanine-p-nitrophenyl ester (5 mole) was added, the substance then being worked up as described under Example XIX. Yield: 2.05 g. with a melting point of 105–125° C. was 82% of the theoretical. Recrystallization from 80% ethanol raised the melting point to 128–130° C.

Analysis: $C_{23}H_{29}N_7O_6$ (mole weight 499.54). Calculated: C=55.30%; H=5.85%; N=19.63%; O=19.22%. C=55.32%; H=6.07%; N=19.42%; O=19.24%.

EXAMPLE XXI

Preparation of carbobenzoxy-phenylalanyl-valyl-ω-nitroarginine amide 1.0 g. XIX (2.22 mole) was dissolved in 5 ml. of dry AcOH and under moisture-free conditions 5 ml. of 2 N HBr in dry AcOH was added. The working-up was conducted as described in Example XIX and the obtained DMF solution (10 ml.) of valyl-ω-nitroarginine amide was cooled to −10° C., whereafter 0.93 g. carbobenzoxy-phenylalanine-p-nitrophenyl ester (2.22 mole) was added under agitation. Purification of the protected tripeptide amide was conducted along the same lines as disclosed in Example XIX. Yield: 1.15 g. with a melting point of 213–220° C. was 86.5 of the theoretical. Two recrystallizations from 80% ethanol raised the melting point of the product to 218–220° C.

Analysis: $C_{28}H_{38}N_8O_7$ (mole weight 598.68). Calculated: C=56.18%; H=6.40%; N=18.72%. Obtained: C=56.29%; H=6.52%; N=18.87%.

EXAMPLE XXII

Preparation of carbobenzoxy-ω-nitroarginyl-ω-nitroarginine methyl ester 35.3 g. carbobenzoxy-ω-nitroarginine (0.1 mole) having a melting point of 134.5–136° C. was dissolved in 200 ml. DMF-THF (1:1) and 13.9 ml. of $Et_3N$ (0.1 mole) was added dropwise under agitation. After cooling to −10° C., 13.66 g. of chloroformic acid isobutyl ester (0.1 mole) was added during a period of 20 minutes, the temperature in the solution during the time being retained between −10° C. and −5° C. ω-Nitroarginine methyl ester dissolved in DMF, released from 27.0 g. ω-nitroarginine methyl ester. HCl (0.1 mole) with 13.9 ml. $Et_3N$ (0.1 mole) precooled to −10° C. was added to the solution, while the temperature in the reaction mixture was −8° C. during the dropwise introduction. The reaction solution was allowed to reach room temperature slowly and after several hours the reaction was complete. $Et_3N.HCl$, formed during the reaction was removed by filtration and the filtrate was evaporated to dryness. The residue was dissolved in 900 ml. of BuOH-EtOAc (2:1), shaken with 1 N hydrochloric acid, a 5% sodium bicarbonate solution, water and the solution intermediate phase dried over magnesium sulphate. After evaporation of the solvent a substance having a melting point of 136–148° C. was obtained. Yield: 34.60 g. (60.8% of the theoretical). The product was recrystallized several times from 80% methanol, the melting point being raised to 147–150° C.

Analysis: $C_{21}H_{32}N_{10}O_9$ (mole weight 568.57). Calculated: C=44.36%; H=5.67%; N=24.64%. Obtained: C=44.38%; H=5.64%; N=24.72%.

EXAMPLE XXIII

Preparation of carbobenzoxy-phenylalanyl-valine methyl ester 29.9 g. carbobenzoxy-phenylalanine (0.1 mole) was dissolved in 75 ml. of DMF, and cooled to −10° C., whereupon 20.6 g. of DCCI dissolved in 25 ml. of DMF was introduced dropwise. Valine methyl ester dissolved in 30 ml. DMF was released from its hydrochloride by adding 13.85 ml. of $Et_3N$ to 16.8 g. of valine methyl ester.HCl (0.1 mole) in DMF, was added dropwise so that the temperature in the reaction solution was maintained at −10° C.

The reaction was complete after 24 hours at room temperature and subsequent to being cooled the formed DCU was filtered off. The filtrate was evaporated to dryness, the residue was dissolved in EtOAc and agitated in the usual manner. Subsequent to the evaporation of EtOAc the residue was dissolved in 80% methanol and 33.5 g. of substance with a melting point of 113–115° C. was crystallized out. Yield: 33.5 g. (81.2% of the theoretical).

Analysis: $C_{23}H_{28}N_2O_5$ (mole weight 412.49). Calculated: C=66.97%; H=6.84%; N=6.79%. Obtained: C=67.09%; H=6.85%; N=6.91%.

EXAMPLE XXIV

Preparation of carbobenzoxy-phenylalanyl-valine hydrazide 8.25 XXIII (20 mole) was dissolved in 150 ml. methanol and 3.94 g. hydrazine hydrate (80 mole) was added. The mixture was refluxed under agitation for 48 hours, concentrated and after the addition of a small amount of water the product was crystalized out. Recrystallization from methanol-water was effected. Yield: 7.35 g. with a melting point of 219–211.5° C. was 89% of the theoretical.

Analysis: $C_{22}H_{28}N_4O_4$ (mole weight 412.5). Calculated: C=64.06%; H=6.84%; N=13.58%. Obtained: C=64.64%; H=6.58%; N=13.63%.

EXAMPLE XXV

Preparation of carbobenzoxy-phenylalanyl-phenylalanine methyl ester 16.2 g. of phenylalanine methyl ester.HCl (75 mole) with a melting point of 158.5–159° C. was dissolved in DMF, cooled to 0° C. and 10.5 ml. of $Et_3B$ (75 mole) was added. The formed $Et_3N.HCl$ was filtered away and the filtrate was cooled to −10° C., whereafter 31.5 g.

carbobenzoxy-phenylalanine - p - nitrophenyl ester (75 mole) was added. After 24 hours at room temperature the solution was recooled to —10° C. and 3.5 ml. of Et₃N (25 mole) was added and the solution was allowed to stand for a further 24 hours. The solution was evaporated in a vacuum to dryness, the residue was dissolved in EtOAc and washed with a 5% sodium bicarbonate solution, water, a 3% hydrochloric acid and water. The EtOAc solution was dried over magnesium sulphate, concentrated to a small volume and after adding petroleum ether the product was crystallized out as needles. Recrystallization was effected twice more from EtOAc (petroleum ether). Yield: 27.85 g. with a melting point of 148.5–149° C. was 80.7% of the theoretical.

Analysis: $C_{27}H_{28}N_2O_5$ (mole weight 460.54). Calculated: C=70.42%; H=6.13%; N=6.08%. Obtained: C=70.69%; H=6.15%; N=6.12%.

EXAMPLE XXVI

Preparation of carbobenzoxy-phenylalanyl-phenylalanine-hydrazide 23.0 g. XXV (50 mole) was dissolved in 500 ml. of dry methanol, 7.5 g. of hydrazinehydrate (0.15 mole) was added, the mixture being refluxed for 4 hours and then allowed to stand at room temperature overnight. The formed precipitate, 18.1 g., with a melting point of 198–200.5° C., was removed by suction, the filtrate being evaporated to approximately 100 ml. and subsequent to the addition of a small amount of water 4.15 g. of substance crystallized out, with a melting point of 196.5–197.5° C. The fractions were recrystallized from methanol, the melting point being raised to 201–203.5° C.

Yield: 19.5 (84.8% of the theoretical).

Analysis: $C_{26}H_{28}N_4O_4$ (mole weight 460.54). Calculated: C=67.81%; H=6.13%; N=12.17%. Obtained: C=67.57%; H=6:08%; N=12.37%.

EXAMPLE XXVII

Preparation of carbobenzoxy-phenylalanyl-glycine ethyl ester 2.8 g. glycine ethyl ester.HCl (20 mole) was dissolved in 20 ml. DMF, 2.05 of Et₃N was added, the mixture was cooled to 0° C. and the formed Et₃N.HCl was removed by filtration. The filtrate was added with a mixture of 6.0 g. of carbobenzoxy-phenylalanine (20 mole) and 4.2 g. DCCI (20 mole) in 20 ml. DMF at—10° C. After 24 hours at room temperature the mixture was cooled to 0° C. and formed DCU was removed by filtration, the filtrate being evaporated to dryness, the residue dissolved in EtOAc and shaken as usual with a 4% hydrochloric acid, 5% sodium bicarbonate solution and water. After drying over magnesium sulphate and concentration the product crystallized when petroleum ether was added. Yield: 6.45 g. with a melting point of 109–111.5° C. was 83.9% of the theoretical. The melting point was raised to 112–112.5° C. upon recrystallization from EtOAc-petroleum ether.

Analysis: $C_{21}H_{24}N_2O_5$ (mole weight 384.44). Calculated: C=65.64%; H=6.29%; N=7.29%. Obtained: C=65.35%; H=6.35%; N=7.40%.

EXAMPLE XXVIII

Preparation of carbobenzoxy-phenylalanyl-glycyl-glycine-ethyl ester 1.97 g. glycyl-glycine ethyl ester.HCl (10 mole) with a melting point of 182–184° C. was dissolved in 30 ml. DMF, the formed Et₃N being added to 1.4 ml. Et₃N (10 mole) HCl was removed by filtration and the filtrate was added with 4.2 g. of carbobenzoxy-phenylalanine-p-nitrophenyl ester (10 mole). Working up was conducted as described in previous examples (XIII). The product was recrystallized from DMF-water. Yield: 3.85 g. with a melting point of 93–95° C. was 87.2% of the theoretical.

Analysis: $C_{23}H_{28}N_3O_6$ (mole weight 441.49). Calculated: C=62.57% H=6.16%; N=9.52%. Obtained: C=62.20%; H=6.05%; N=9.72%.

EXAMPLE XXIX

Preparation of carbobenzoxy-phenylalanyl-glycine hydrazide 6.35 g. XXVII (16.5 mole) was dissolved in 50 ml. methanol, 3.2 g. of hydrazine hydrate (64 mole) was added and subsequent to agitation for 24 hours at room temperature the solution was evaporated to dryness. The residue was dissolved in a small amount of warm methanol, whereafter the product crystallized out. Yield: 4.95 g. with a melting point of 151.5–152.2° C. was 81.0% of the theoretical.

Analysis: $C_{19}H_{22}N_4O_4$ (mole weight 370.42). Calculated: C=61.61%; H=5.99%; N=15.13%. Obtained: C=61.80%; H=5.87%; N=15.22.

EXAMPLE XXX

Preparation of carbobenzoxy-phenylalanylglycyl-glycine hydrazide 2.1 g. of XXVIII (4.73 mole) was dissolved in 25 ml. of methanol, 0.9 g. of hydrazine hydrate (18 mole) was added and after two days at room temperature the precipitation formed was removed by filtration and washed with water. The product was recrystallized from methanol. Yield: 1.75 g. at a melting point of 190–191° C. was 86.6% of the theoretical.

Analysis: $C_{21}H_{25}N_5O_5$ (mole weight 427.47). Calculated: C=59.01%; H=5.90%; N=16.38%. Obtained: C=59.49%; H=5.95%; N=16.50%.

The terminal alpha-amino groups of the peptides and remaining amino groups protected by carbobenzoxy groups were released from their protective groups by hydrogenating away the carbobenzoxy group as toluene and carbonic acid. The nitro group in the arginine was simultaneously reduced away as ammonium by means of hydrogen gas as well as a reduction agent, and palladium on charcoal as a catalyst. Since all the reduction processes were conducted in the same way with the exception of small variations which can be included in a table only a general description of the experiment is included in this document. (For experimental details see Table 2.)

The protected peptide ester was dissolved in an alcohol, methanol or ethanol, and the requisite number of equivalents of the salt-forming acid was added in the form of either an aqueous solution or alcohol solution. The catalyst moistened with water (10% palladium on charcoal) was added in an amount which corresponded to 100 mg. millimole peptide. The amount of catalyst was somewhat increased when the length of the pepide increased. When the catalyst was flushed from the sides of the reaction vessel all air was expelled from the reduction apparatus with nitrogen gas. The nitrogen gas in turn was expelled with hydrogen gas. The reduction system was closed and hydrogen gas was obtained for the reduction via a measuring vessel serving as a hydrogen gas reservoir. The reaction was started by strong agitation in the reduction vessel and formed carbon dioxide was absorbed in a flask, containing 50% potassium liquor, under agitation and connected to the reaction vessel. By means of a level flask connected to the hydrogen gas reservoir, including water as a blocking liquid, the hydrogen gas consumption was read for a complete reaction (corrected to normal pressure and temperature and reduced with partial pressure of the water at the relevant temperature). The reaction time varies considerably, from 2 to 12 hours, in dependence of the length of the peptides and the presence of nitro groups in the arginine. When the reaction was terminated nitrogen gas was led through the reaction vessel to drive out the hydrogen gas. The catalyst was filtered away, the filtrate evaporated to dryness and the residue digested a number of times with dry ether; whereafter the product became solid and granular. All peptide esters are hygroscopic as hydrochlorides and must therefore be worked up and isolated in a drying chamber which is kept cool and under moisture free conditions.

EXAMPLE XXXI

Preparation of carbobenzoxy-valyl-ω-nitroarginine-isopropylester 2.5 grams of ω-nitroarginine-isopropyl ester hydrochloride (8.4 mol) were dissolved in 30 ml. of DMF (dimethylformamide); after cooling, 1.2 ml. of triethyl amine (8.4 mole) were added and the resulting triethyl amine hydrochloride was removed by filtration. The filtrate was cooled to −10° C. and 3.2 grams of carbobenzoxy-valine-p-nitrophenyl ester (8.4 mol) were added whilst stirring. After standing for 2 hours at −10° C. the substance was permitted to adopt room temperature and react at this temperature for one day. The reaction mixture was recooled to −10° C., whereafter a further 1.2 ml. of triethyl amine were added; the reaction being practically complete after a few hours. DMF was evaporated in vacuum at 30–40° C., and the evaporation residue was dissolved in about 500 ml. of ethylacetate saturated with water. The solution was extracted as usual with a 5% aqueous sodium bicarbonate solution, water, 1 N aqueous hydrochloric acid solution and water; the organic phase was dried over magnesium sulphate and evaporated in vacuum to dryness. The residue was dissolved in hot ethylacetate and, subsequent to adding dry isopropyl ether, the substance crystallized out when stored in a refrigerating cabinet. The yield 3.65 grams having a melting point of 162–166° C., is 88% of the theoretical. The melting point increases to 1.65–1.68° C. after further recrystallization from ethyl-acetate-isopropyl ether. When recrystallized from methanolethylacetate the substance obtained a melting point of 115–116° C. The substance is uniform upon thin-layer chromatography on silica gel in three different solvent systems and has an optic rotation $[\alpha]_D^{24} = -24.6°$ (c.=1, methanol).

Analysis: $C_{22}H_{34}N_6O_7$ (mole weight 494.56). Calculated: C=53.43%; H=6.93%; N=16.99%. Obtained: C=53.20%; H=6.99%; N=17.11%.

EXAMPLE XXXII

Preparation of carbobenzoxy-phenylalanyl-valyl-ω-nitroarginine-isopropyl ester 2.0 grams of carbobenzoxy-valyl-ω-nitroarginine-isopropyl ester (4.05 mole) were dissolved in 10 ml. of dry glacial acetic acid, 5 ml. 4 N hydrobromide in glacial acetic acid were added and the mixture stirred for 1 hour at room temperature protected from moisture in the air. During the reaction time a quantity of tripeptide ester hydrobromide crystalline, precipitated and became complete upon addition of 2.50 ml. dry ether. The ether phase was decanted off and the precipitate treated a further 3–4 times with dry ether. The precipitate was dried in vacuum over potassium hydroxide and $P_2O_5$, and was highly hygroscopic.

The obtained tripeptide ester hydrobromide was dissolved in 15 ml. of DMF, cooled to 0° C. and added with 1 ml. of triethylamine (7.3 mole). The resulting triethylamine hydrobromide was removed by filtering and 1.7 grams of carbobenzoxy-phenyl-alanine p - nitro - phenylester (4 mole) were added to the filtrate. After some hours at −10° C. the temperature was allowed to rise to 20° C. in the reaction solution. The reaction solution was recooled to −10° C. whereafter a further 1 ml. of triethylamine was added and the reaction mixture allowed to stand overnight. The solution was evaporated in vacuum to dryness and the residue dissolved in a mixture of ethylacetate-n-butanol (2:1). The organic phase was extracted as usual with a 5% aqueous sodium bicarbonate solution, water, a 1 N aqueous hydrochloric acid solution and water and dried over magnesium sulphate. The dried solution was evaporated to dryness, and the residue dissolved in hot methanol-ethyl-acetate (1:1) and subsequent to remaining in the refrigerating cabinet for 1 day, 1.93 grams of the substance crystallized out with a melting point of 175–177° C. Recrystallization increased the melting point to 178–179° C. The yield was 1.75 grams, which is 68% of the theoretical. The substance was uniform in thin layer chromatography on silica gel and had an optical rotation $[\alpha]_D^{25} = 25.7°$ (c.=1, methanol).

Analysis: $C_{31}H_{43}N_7O_8$ (mole weight 641.74). Calculated: C=58.01%; H=6.75%; N=15.28%. Obtained: C=58.32%; H=6.92%; N=15.19%.

EXAMPLE XXXIII

Preparation of carbobenzoxy-valyl-ω-nitroarginyl-ω-nitroarginine methyl ester 5.7 grams of carbobenzoxy-ω-nitroarginyl - ω - nitroarginine methyl ester (10 mole) and 30 ml. dry glacial acetic acid were placed in a flask protected from air moisture, whereafter 10 ml. of 4 N hydrobromide in dry glacial acetic acid were added rapidly. After stirring for one hour at room temperature the carbobenzyloxylation was complete, a plastic composition having been formed. The reaction mixture was poured whilst stirring vigorously into 700 ml. of dry ether, whereupon a hard plastic composition was formed which was partially crystalline on the surface. The ether phase was decanted off and the residue digested with dry ether, which was once more decanted off. The process was repeated until the product had become crystalline, whereafter the product was dried over $P_2O_5$ and potassium hydroxide in vacuum. The dipeptide ester hydrobromide yield was 6.5 g. and determination of the bromide content showed that the substance contained 2.3 equivalents of hydrobromide. The substance was dissolved in 40 ml. DMF, cooled to 0° C. and added with 3.5 ml. of triethylamine (25 mole). The resulting triethylamine hydrobromide was removed by filtering, and 3.75 g. of carbobenzoxy-valin p-nitrophenylester were added to the filtrate, whereafter the reaction mixture was permitted slowly to adopt room temperature overnight. An additional 1.4 ml. of triethylamine (10 mole) was added to the mixture after it had cooled to −10° C. and the composition was permitted to react overnight. The solution was evaporated to dryness and the residue treated with ether, a small quantity of ethylacetate, a 5% sodium bicarbonate solution, a 10% aqueous citric acid solution, water and dissolved in hot methanol, which subsequent to the addition of ethylacetate gave 5.1 grams of a yellow crystalline product. Two recrystallizations from methanol-ethylacetate (1:1) finally resulted in a product having a melting point of 119–122° C. and an optical rotation $[\alpha]_D^{25} = -12.3°$ (c.=1, DMF). Thin layer chromatography on silica gel of the product in three different solvent systems resulted in only one colored zone, which indicates that the substance is uniform. The yield: 4.35 grams (65.2% of the theoretical).

Analysis: $C_{24}H_{41}N_{11}O_{10}$ (molecular weight 643.68). Calculated: C=44.78%; H=6.42%; N=23.94%. Obtained: C=44.52%; H=6.38%; N=24.11%.

EXAMPLE XXXIV

Preparation of carbobenzoxy-phenylalanyl-valyl-ω-nitroarginyl-ω-nitroarginine methyl ester 1.30 grams of carbobenzoxy-valyl-ω-nitroarginyl-ω-nitroarginine methyl ester was decarbobenzoxylated as described in previous examples. Subsequent to working up, 1.55 grams of a highly hygroscopic tripeptide ester hydrobromide was obtained, which upon determination of the bromide content was found to contain 2.4 equivalents of hydrobromide. The tripeptide ester hydrobromide was dissolved in 15 ml. of DMF, cooled to −10° C., whereafter 0.67 ml. of triethylamine (4.8 mole) was added. The resulting triethylamine hydrobromide was removed by filtering and 0.84 gram of carbobenzoxy-phenylalanine p-nitrophenylester (2 mole) was added to the filtrate, whereafter the reaction solution was permitted to rise to room temperature overnight. 0.28 ml. of triethylamine was added to the solution which was subjected to continued stirring for a few more hours. The reaction mixture was evaporated to dryness, and the residue treated with ether which contained a small quantity of ethylacetate, aqueous 5% sodium bicarbonate solution water, a 10% aqueous citric acid solution and water.

The residue was dried and then dissolved in methanol-DMF (4:1), treated with activated carbon and the clear filtered solution was placed in the refrigerating cabinet over night, whereupon 1.48 grams of the substance having a melting point of 234–240° C. were obtained. By subjecting the substance to a further recrystallization the melting point was raised to 239–241° C. The yield of chromatographic uniform substance was 1.15 g. having an optical rotation $[\alpha]_D^{24} = -9.6°$ (c.=0.5, DMF) representing 70.6% of the theoretical.

Analysis: $C_{35}H_{50}N_{12}O_{11}$ (molecular weight 814.88). Calculated: C=51.59%; H=6.19%; N=20.62%. Obtained: C=51.81%; H=6.09%; N=20.95%.

EXAMPLE XXXV

Preparation of carbobenzoxy-phenylalanyl-valyl-ω-nitroarginyl-ω-nitroarginine methyl ester 408 mg. of carbobenzoxy-phenylalanyl-valyl-ω-nitroarginyl-ω-nitroarginine methyl ester (0.5 mole) were decarbobenzoxylated as described in previous examples. 538 mg. of the resulting tetrapeptide ester hydrobromide containing 2.4 chemical equivalents of hydrobromide were dissolved in 10 ml. DMF, cooled to −10° C., and added with 0.17 ml. triethylamine, whereafter the resulting triethylamine-hydrobromide was removed by filtering. 0.21 gram of carbobenzoxy-phenylalanine p-nitrophenylester (0.5 mole) was added to the filtrate. The reaction sequence was the same as that described in the previous examples. The solution was evaporated to dryness in vacuum and the residue digested with ether, a 5% aqueous sodium bicarbonate solution, water, a 10% aqueous citric acid solution and water. The thus treated product was dissolved in hot methanol which, after standing for one day in the refrigerating cabinet, gave 4.18 mg. of a product having a melting point of 230–238° C. Subsequent to subjecting the substance to an additional two-recrystallization processes from methanol a chromatographic uniform substance was obtained having a melting point of 236–240° C. and an optical rotation $[\alpha]_D^{25} = 20.0°$ (c.=3.8, DMF). The yield was 338 mg., which represented 70.3% of the theoretical.

Analysis: $C_{44}H_{59}N_{13}O_{12}$ (molecular weight 962.06). Calculated: C=54.93%; H=6.18%; N=18.93%. Obtained: C=54.62%; H=6.25%; N=19.10%.

EXAMPLE XXXVI

Preparation of carbobenzoxy-glycyl-proline 7.2 grams of proline (63 mole) were dissolved in a mixture of 160 ml. of pyridine-water (1:1) and the pH of the solution adjusted with 4 N NaOH to 8.8. 20.7 g. of carbobenzoxy-glycine-nitrophenylester (63 mole) were added at room temperature in small portions whilst stirring, the pH being maintained whilst adding said portions between 8.5–8.8 with 4 N NaOH. After one hour 25 g. of sodium bicarbonate, 200 ml. water were added and the solution extracted with ethylacetate (10× 60 ml.) and the water phase acidified with 4 N hydrochloric acid to pH 3.5. The acidified water phase was extracted with ethylacetate and the organic phase was washed with a 1 N aqueous hydrochloric acid solution and dried over magnesium sulphate. Subsequent to concentration in vacuum 14.5 grams of the substance crystallized out, which subsequent to being subjected to a further recrystallization from ethyl-acetate, 12.2 g. of product having a melting point of 155–156° C. and an optical rotation $[\alpha]_D^{25} = -54.0°$ (c.=1, DMF) and an equivalent weight of 304.8 against the calculated 306.3 was obtained.

EAXMPLE XXXVII

Preparation of carbobenzoxy-glycyl-proline-nitrophenyl ester 9.2 grams of carbobenzoxy-glycyl-proline (30 mole) were dissolved in 75 ml. DMF together with 4.6 grams of p-nitrophenol (33 mole). The solution was cooled to −5° C. and 6.4 g. of dicyclohexyl carbodiimide (31 mole) dissolved in a small quantity of DMF were added, whereupon the temperature was prevented from rising above 0° C. The temperature was allowed to rise slowly to room temperature overnight, and the precipitate (dicyclohexylurea) filtered off. The filtrate was concentrated to 40 ml. in vacuum and added dropwise to 1 litre of water whilst stirring. The resulting semi-solid substance was isolated and dissolved in ethylacetate, which was dried over magnesium sulphate. The ethylacetate solution was evaporated to dryness and the residue dissolved in a mixture of ethylacetate-dry ether (1:1) and, subsequent to being added with petroleum ether, 6.6 grams of the substance crystallized out with a melting point of 104–105.5° C. and an optical rotation $[\alpha]_D^{24} = -87.5°$ (c.=1, DMF).

EXAMPLE XXXVIII

Preparation of carbobenzoxy-glycyl-propyl-ω-nitro-arginine methyl ester 2.7 grams of ω-nitroarginine methyl ester hydrochloride (10 mole) were dissolved in 30 ml. of DMF, and the mixture cooled to 0° C., whereafter 1.40 ml. triethylamine were added. The resulting triethyl amine hydrochloride was removed by filtering and 4.3 grams of carbobenzoxy-glycyl-proline p-nitrophenylester were added to the filtrate, whereupon after one day at room temperature a further 1.4 ml. of triethylamine were added. The reaction solution was evaporated to dryness in vacuum, and the residue digested with ether, a 5% aqueous sodium bicarbonate solution, water, 10% aqueous citric acid solution and water. The residue was dissolved in a small quantity of hot DMF and, subsequent to the addition of water, 3.1 g. of the product crystallized out, which was recrystallized from DMF-water. This substance was obtained in a yield of 53.7% (2.8 g.) and was chromatographically uniform and had a melting point of 105–107° C.

Analysis: $C_{22}H_{31}N_7O_8$ (molecular weight 521.55). Calculated: C=50.66%; H=5.99%; N=18.80%. Obtained: C=51.01%; H=5.84%; N=18.85%.

EXAMPLE XXXIX

Preparation of carbobenzoxy-phenyl-alanyl-valyl-ω-nitroarginine 2.45 grams of carbobenzoxy-phenyl-alanyl-valyl-ω-nitro-arginine methyl ester (4 mole) were dissolved in 30 ml. of 80% acetone and saponified with 4 ml. of NaOH whilst controlling the pH (11.1–12.5). Carbon dioxide was introduced into the solution until pH was 7.8 whereafter the solution was evaporated in vacuum. The residue was dissolved in water and the solution extracted with ethylacetate and the water phase acidified with citric acid solution. The resulting precipitate was extracted with ethylacetate and the organic phase washed neutral with water, dried over $MgSO_4$ and evaporated to dryness in vacuum. The residue was recrystallized from ethanol-water. The yield of chromatographically pure product was 1.95 g. which represented 76.7% of the theoretical having an optical rotation $\alpha_D^{23} = -12.2°$ (c.=1.1, methanol), with an equivalent weight of 625.3 against the calculated 626.7 for the title substance containing two moles of crystal water.

EXAMPLE XL

Preparation of carbobenzoxy-phenylalanyl-valyl-ω-nitroarginyl-glycyl-prolyl-ω-nitroarginine methyl ester 334.6 mg. of carbobenzoxy-glycyl-prolyl-ω-nitroarginine methyl ester (0.8 mole) were decarbobenzoxylated and worked up as described in previous examples. The tripeptide ester hydrobromide was dissolved in 2 ml. of freshly distilled DMF, 22.2 ml. of triethylamine were added and the resulting triethylamine hydrobromide removed by filtering, whereupon the filtrate was cooled to −10° C. and 509 mg. of carbobenzoxy-phenyl-alanyl-valyl-ω-nitroarginine (0.8 mole) dissolved in 2.5 ml. of DMF precooled to −10° C. were added. 165 mg. of DCCI (0.8 mole) were added whilst stirring; the solution was left to stand for three days at room temperature. The solution was evaporated to dryness in vacuum and the residue 933 mg. were dissolved in 3 ml. DMF, cooled to −20° C., whereupon 128 mg. of DCU crystallized out. Preparative thin layer chromatography of the atorting product on silica gel in the solvent system: n-butanol: acetic acid:water (6:2:2) resulted in a pure product having an $R_f$-value of 0.64. Total hydrolysis of 1.2 mg. of the substance in 6 N hydrochloric acid for 48 hours at 110° C. two dimensional this layer chromatography of the hydrolysate on silica gel gave the amino acid in the hexapeptide derivative. The yield of chromatographically pure substance was 185 mg. (19.1% of the theoretical). The substance had a melting point 125–127° C., an optical rotation $\alpha_D^{23}=32.0°$ C. (c.=0.5, DMF).

Analysis: $C_{42}H_{60}N_{14}O_{13}$ (molecular weight 969.05). Calculated: C=52.06%; H=6.24%; N=20.24%. Obtained: C=51.84%; H=6.15%; N=20.13%.

TABLE 3

| Peptide | No. of amino acids | Relative inhibition |
|---|---|---|
| Arg-OMe | 1 | 0.028 |
| Phe-Arg-OMe | 2 | 0.053 |
| Val-Arg-OMe | 2 | 0.032 |
| Val-Arg-NH₂ | 2 | 0.037 |
| Phe-Arg-NH₂ | 2 | 0.000 |
| Phe-Val-Arg-OMe | 3 | 0.18 |
| Phe-Gly-Val-Arg-OMe | 4 | 0.10 |
| Phe-Phe-Val-Arg-OMe | 4 | 0.19 |
| Phe-Leu-Val-Arg-OMe | 4 | 0.11 |
| Phe-(Gly)₂-Val-Arg-OMe | 5 | 0.076 |
| Phe-(Gly)₃-Val-Arg-OMe | 6 | 0.15 |
| Phe-Leu-Ala-Glu-γOMe-(Gly)₃-Val-Arg-OMe | 9 | 0.39 |

The vascular active bradykinin-like activity of two of the most active peptides of this invention has been measured as a percentage increase in the blood-flow in arterial femoralis upon intra-arterial injection in dogs, with a solution at a concentration of 1 mg. peptide/ml. and an injection rate of between 1–3 ml./min.

TABLE 4

| Peptide | Amount of peptide per ml. blood | Flow increase in percent |
|---|---|---|
| Phe-Val-Arg-OMe | 0.017 | 130 |
|  | 0.031 | 270 |
|  | 0.033 | 260 |
|  | 0.05 | 480 |
|  | 0.1 | 520 |
| Phe-Leu-Ala-Glu-γOMe-(Gly)₃-Val-Arg-OMe | 0.033 | 140 |
|  | 0.05 | 360 |
|  | 0.1 | 310 |

TABLE 2

| Peptide derivative to reduction | Amount of peptide derivative Weight | Amount of peptide derivative Mmole | Amount of 10% Pd/C | Hydrogen in ml. Calculated | Hydrogen in ml. Used | Reduction period in hours | Yield of reduced peptide ester plus NH₄Cl Weight | Yield of reduced peptide ester plus NH₄Cl Percent | Chloride in product Calculated | Chloride in product Obtained | Amino acid analysis |
|---|---|---|---|---|---|---|---|---|---|---|---|
| HCl·H-Arg(NO₂)-OMe | 5.39 g | 20 | 2 g | 1,793 | 1,580 | 4 | 5.3 g | 87.6 | 35.15 | 33.90 | |
| I | 4.66 g | 10 | 1 g | 1,120 | 1,025 | 5 | 3.25 g | 78.6 | 25.02 | 24.12 | Val, 0.99; Arg, 1.01; NH₃, 0.92. |
| XI | 255 mg | 0.227 | 75 mg | 25.5 | 22.5 | 12 | 195 mg | 80.9 | 10.04 | 9.76 | Phe, 0.95; Leu, 1.03; Ala, 1.09; Glu, 1.04; Gly, 3.00; Val, 1.03; Arg, 0.96; NH₃, 0.96. |
| XII | 515.6 mg. | 1 | 100 mg | 112 | 112 | 5 | 575 mg | 81.2 | 23.03 | 21.92 | Phe, 1.00; Arg, 1.00; NH₃, 0.85. |
| XIII | 5.0 g | 8.15 | 1 g | 913 | 880 | 6 | 4.45 g | 97.4 | 18.96 | 17.90 | Phe, 1.01; Val, 1.02; Arg, 0.97; NH₃, 0.83. |
| XIV | 826 mg | 1.25 | 150 mg | 138 | 135 | 6 | 695 mg | 91.3 | 17.21 | 17.05 | Phe, 1.02; Gly, 1.00; Val, 1.02; Arg, 0.96; NH₃, 0.97. |
| XV | 773 mg | 1.00 | 125 mg | 119 | 112 | 7 | 650 mg | 90.7 | 15.76 | 14.98 | Phe, 1.02; Gly, 2.03; Val, 0.98; Arg, 0.97; NH₃, 0.84. |
| XVI | 450 mg | 0.57 | 100 mg | 64 | 55 | 8 | 390 mg | 92.9 | 14.53 | 14.13 | Phe, 1.00; Gly, 2.98; Val, 0.98; Arg, 0.96; NH₃, 0.72. |
| XVII | 352 mg | 0.46 | 50 mg | 52 | 55 | 6 | 203 mg | 86.4 | 15.02 | 14.27 | Phe, 2.01; Val, 1.02; Arg, 0.97; NH₃, 0.73. |
| XVIII | 1,374 mg | 1.89 | 200 mg | 212 | 200 | 7 | 1,050 mg | 82.4 | 15.78 | 14.54 | Phe, 1.01; Leu, 0.99; Val, 1.02; Arg, 0.97; NH₃, 0.76. |
| XIX | 560 mg | 1.24 | 150 mg | 139 | 150 | 5 | 450 mg | 91.0 | 26.68 | 24.53 | Val, 1.02; Arg, 0.98; NH₃, 1.74. |
| XX | 1,237 mg | 2.40 | 200 mg | 278 | 295 | 6 | 995 mg | 89.9 | 23.01 | 22.49 | Val, 1.02; Arg, 0.98; NH₃, 1.74. |
| XXI | 675 mg | 1.13 | 100 mg | 126 | 141 | 6 | 315 mg | 83.7 | 19.49 | 18.64 | Phe, 1.00; Val, 1.02; Arg, 0.97; NH₃, 1.94. |

The antithromboplastic activity given as the relative activity compared to the activity of a specific quantity of standard trypesin inhibitor from lungs, for a number of polypeptides of this invention and structural related compounds has been given in Table 3.

The values in column 3 show the 50% inhibition of the thromboplastinic activity expressed in corresponding amounts of trypsin inhibitor (mg.) per millimole peptide. —OMe in the table formulas represents a methyl ester group. The first five substances listed in the table have been included for comparison purposes, and do not form part of the invention. It will be seen from the table that a marked increase in the activity takes place when three amino acids are present in the peptide, i.e., when integral helices are reached.

What is claimed is:
1. A peptide selected from the group of peptides of the formula

Phe—Val—Arg—OCH₃ and

Phe—Y—Val—Arg—OCH₃ wherein Y is selected from the group consisting of

—Gly—

—Phe—

—Leu—

—Gly—Gly—

—Gly—Gly— and

—Leu—Ala—Glu—Gly—Gly—Gly—

(References on following page)

References Cited

UNITED STATES PATENTS

| | | | |
|---|---|---|---|
| 3,228,839 | 1/1966 | Kappeler et al. | 424—177 |
| 3,247,180 | 4/1966 | Schwyzer et al. | 260—112.5 |
| 3,268,502 | 8/1966 | Lübke et al. | 260—112.5 |
| 3,272,790 | 9/1966 | Bernardi et al. | 260—112.5 |

FOREIGN PATENTS

| | | | |
|---|---|---|---|
| 1,804,022 | 5/1967 | Germany | 260—112.5 |

OTHER REFERENCES

Doolittle et al., Arch. Biochem. Biophys. *118*, 456–467 (1967).

Blombäck et al., Acta. Chem. Scand. *19*, 1789–1791 (1965).

Blombäck et al., Biochem. Biophys. Acta. *115*, 371–396 (1966).

Blombäck et al., Acta. Chem. Scand. *19*, 751–753 (1965).

Blombäck et al., Acta. Chem. Scand. *19*, 1788–1789 (1965).

Blombäck et al., cited in Chem. Abst. *72*, 62825 (1970.

ELBERT L. ROBERTS, Primary Examiner

U.S. Cl. X.R.

424—177